US006337738B1

(12) United States Patent
Kishi (10) Patent No.: US 6,337,738 B1
(45) Date of Patent: Jan. 8, 2002

(54) METHOD AND APPARATUS FOR DETECTING POSITIONS OF LIGHT EMITTING ELEMENTS

(75) Inventor: Kazuyoshi Kishi, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 0 days.

(21) Appl. No.: 09/332,936

(22) Filed: Jun. 15, 1999

(30) Foreign Application Priority Data

Jun. 16, 1998 (JP) .......................................... 10-186949

(51) Int. Cl.[7] .................................................. G01J 1/00
(52) U.S. Cl. ...................................................... 356/121
(58) Field of Search ................................ 356/614, 121, 356/228, 229; 250/878.1

(56) References Cited

U.S. PATENT DOCUMENTS

| 5,166,510 A | 11/1992 | Matsubara et al. | |
|---|---|---|---|
| 5,699,103 A | 12/1997 | Fleming | |
| 5,774,165 A | * 6/1998 | Nakajima et al. | 347/236 |

FOREIGN PATENT DOCUMENTS

| EP | 0310266 | 4/1989 |
|---|---|---|
| EP | 0424174 | 4/1991 |
| JP | 63264378 | 11/1988 |
| JP | 08142406 | 6/1996 |

OTHER PUBLICATIONS

H.M.Mims III, Measuring LED Power Distribution, Electro–Optical Systems Design, vol. 8, No. 6, p. 40–41, Jun. 1976.*

* cited by examiner

Primary Examiner—Frank G. Font
Assistant Examiner—Zandra Smith
(74) Attorney, Agent, or Firm—Smith Patent Office (57) ABSTRACT

A method and apparatus for detecting positions which can accurately detect the position of light emitting elements and improves the ease in operation are disclosed. Light emitting elements of a PLZT shutter array that are arranged in one dimension are lighted. A light receiving element transfer system makes a light receiving element or receiver scan along an imaging face of the PLZT shutter array by sampling analog data which has been taken in by the light receiving element 22 so that a data series can be obtained. A minimal value of the data series is determined to be a threshold. Then by comparing the threshold and the data series sequentially from the beginning, the first place where the threshold is exceeded is detected. A maximum value within a searching range of one cycle from this first place is detected. The position of the maximum value is considered to be a beginning or first light emitting element position among the lighted light emitting elements. Subsequently each light emitting element is detected by detecting a maximum value within one cycle of searching range after a half cycle following the preceding light emitting element. Each detected maximum value position is considered to be a light emitting element position.

16 Claims, 13 Drawing Sheets

METHOD AND APPARATUS FOR DETECTING POSITIONS OF LIGHT EMITTING ELEMENTS

BACKGROUND OF THE INVENTION

1. Field of the Invention

This invention relates to a method and apparatus for detecting positions of elements. Specifically it relates to a position detecting method and a position detecting apparatus for light emitting elements used, for example, in an image forming apparatus which forms an image by correcting the light emitting amount from each light emitting element of a print head array.

2. Discussion of the Related Art

In recent years, a print head array where micro light emitting elements are arranged in a predetermined pitch has been used in an image forming apparatus that rapidly forms a highly resolved image. However, the light amount emitted from each light emitting element generally varies. The variation in the light amount emitted is recorded just as are irregularities in the light and shade amount of the image that definitely cause a deterioration of picture quality. Therefore correction of the luminous power is performed so that the light amount emitted from each light emitting element is uniform. For correcting the luminous power, it is necessary to detect the luminous power of every light emitting element.

Previously the light amount emitted was detected by making a light receiving element scan along an imaging face of a plurality of light emitting elements arranged in one direction with a pulse motor. It had been accomplished by correlating a number of pulses given to the pulse motor and the position of light emitting element. Therefore each light emitting element position was virtually detected based on a counted value of the pulse number. The light receiving amount at that position was recognized as a light emitted amount corresponding to that light emitting element.

However in correlating the number of pulses and the light emitting element positions, errors could not be avoided and it was difficult to detect the light emitting element positions based on the counted value of the pulse number. Therefore, if the plurality of light emitting elements arranged in one direction had a short length, the required precision could be obtained. However when a longer length was involved, the difference caused by errors became to large to be ignored. Thus the difference between the light emitting element position virtually detected based on the number of pulses and the actual light emitting element position occurring resulted in the proper position of the light emitting element not being detected.

Further, to correlate the counted value of the pulse number and the position of the light emitting element with as small an error as possible, it was necessary to accurately establish a base position of the light receiving element as well as an amount of movement of the light emitting element from the base position. This then required very high precision in machining and assembling the apparatus and it deteriorated the ease of operation.

Therefore, the primary objects of this invention are to provide method and apparatus for detecting positions which can accurately detect the position of the light emitting elements and improve the ease of operation.

SUMMARY OF THE INVENTION

To solve the above problems, in one aspect of this invention, a position detecting method for detecting a position of each light emitting element of a print head having a plurality of light emitting elements arranged along one direction is disclosed. The position detecting method comprises lighting selected light emitting elements among the plurality of light emitting elements, measuring luminous power emitted from the light emitting elements by making a light receiver scan in the direction of arrangement of the light emitting elements, obtaining a data series indicating luminous power based on the results of said step of measuring, comparing the data series with a threshold and detecting a first place that exceeds the threshold from the beginning of the data series, determining a position of a maximum value closest to the first place as a first light emitting element position among the lighted light emitting elements, and determining additional positions of maximum value as light emitting element positions in terms of the positions of the light emitting elements after the first light emitting element position.

In a second aspect of the invention, the step of lighting selected light emitting elements further comprises alternately lighting the plurality of light emitting elements.

In a third aspect of the invention, the step of determining a position of maximum value further comprises expanding a searching range and detecting the maximum value when the maximum value can not be detected within a searching range of one cycle.

In a fourth aspect of the invention, the step of determining additional positions of maximum value further comprises detecting the maximum value within a searching range of one cycle after a half cycle following the position of a preceding light emitting element after the first light emitting element position is detected.

In a fifth aspect of the invention, the step of determining additional positions of maximum value further comprises treating a center of the searching range of one cycle as the light emitting element position when the maximum value is detected farther away from a center of the searching range of one cycle than a predetermined position.

In a sixth aspect of the invention, the threshold is any one of a plurality of minimum values contained in the data series from the light receiver.

In a seventh aspect of the invention, the threshold is an arbitrary value.

In an eighth aspect of the invention, the print head includes a lead lanthanum zirconate titanate (PLZT) shutter array.

In a ninth particular aspect of the invention, a position detecting apparatus for detecting a position of each light emitting element of a print head having a plurality of light emitting elements arranged in one direction is disclosed. The position detecting apparatus comprises lighting means for selectively lighting the light emitting elements, light receiving means for measuring luminous power emitted from said light emitting elements, scanning means for making said light receiving means scan in the direction said light emitting elements, means for obtaining at least one data series indicating luminous power based on measurements obtained by said light receiving means, detecting means for comparing the data series with a threshold and detecting a first place exceeding the threshold from the beginning of the data series, means for determining a position of maximum value closest to the first place as a first light emitting element position among the light emitting elements lighted by said lighting means, and means for determining additional positions of maximum value as light emitting element positions in terms of the positions of the light emitting element after the first light emitting element position.

According to one of the aspects of the invention, the amount of light received is measured by scanning along the imaging face of the plurality of light emitting elements arranged in one direction and based on these measurements, the predetermined cycle of data series are obtained. Then, a first place exceeding the threshold from the beginning of the data series is detected, the maximum value closest to that place is detected, and the position of the maximum value is considered as the beginning or first light emitting element position. Thereafter, the positions of the maximum values are considered as the light emitting element positions and a similar process is repeated to detect the light emitting element positions until the last light emitting element position is detected.

Herein, among the imaging faces, the amount of light received from a position where the light from each light emitting element is perpendicularly irradiated is larger than amount of light received from its surrounding portion. Thus the data series indicating the luminous power has a maximum amount at the perpendicularly irradiated position. This position having the maximum value corresponds to the position of light emitting element. Accordingly the detecting of the maximum value of the data series allows the detection of the position of light emitting element. Then even in the case of a long length display, errors are unlikely to occur and the position of the light emitting elements can be accurately detected. Further the position detection is performed by detecting the maximum value, so high precision is not required for the mechanical machining and assembly.

These features are similar with regard to the position detection apparatus according to the ninth particular aspect of the invention.

In the case where the spacing between the light emitting elements is very small and the data series from which a maximum value can be detected is not obtained, the data series from which the maximum value can be detected becomes obtainable by alternately lighting the light emitting elements as the position detecting method according to the second aspect of the invention. Then based on this data series, the position of light emitting element can be detected.

According to the third aspect of the invention, when the maximum value can not be detected within a searching range of one cycle from the first place, the maximum value is detected by expanding the searching range. Accordingly, when the maximum value within the searching range lies at the end of the searching range, misdetection of the maximum value by considering the maximum amount as the end point of the range is eliminated and the precision for detecting the positions of the light emitting elements can be improved.

According to the fourth aspect of the invention, it is realized that only one maximum value usually exists in one cycle of the data series. Then the searching range for the maximum value is set within one cycle from a half cycle after the preceding position of light emitting element.

According to the fifth aspect of the invention, taking into account that when the maximum value is detected farther away from a center of the searching range of one cycle than the predetermined position, failure of the light emitting elements, etc. is assumed to be its cause. Then in this case, this affects the detection of the following light emitting element positions, when the maximum value is detected farther away from the center of the searching range than the predetermined position. Thus the light emitting element is deemed to have failed and the center of the searching range is considered as the light emitting element position. Thereby, failure of a light emitting element can not influence the detection of the following light emitting elements position.

Further, according to the sixth or seventh aspect of invention, the threshold can be any one of a plurality of minimum amounts contained in the data series or even an arbitrary value. According to the eighth aspect of the invention, the print head can be, for example, a PLZT shutter array.

According to this invention, it is taken into account that the data series indicating the luminous power at the position where the light from each light emitting element is perpendicularly irradiated among the imaging faces of the light emitting elements of the print head is maximum and that the position with the maximum value corresponding to the light emitting element position is detected by detecting the maximum value of the data series so the light emitting element position is detected. Accordingly in the case of the longer length display, errors are unlikely to occur, the light emitting element can be accurately detected and the proper luminous power correction becomes possible.

Further, the light emitting element position is detected by detecting the maximum value, different from the prior method for detecting the light emitting element position based on the pulse number of the motor and therefore, high precision for the mechanical machining and assembly is not required, and the ease in operation is improved.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote the same or similar parts or elements, and in which:

FIGS. 6A–6D are graphs that respectively indicate a data series concerning a luminous power; a data series at the time when all of the light emitting elements are turned ON; a data series at the time when only the even numbered light emitting elements are turned ON; and a data series at the time when only the odd numbered light emitting elements are turned ON;

FIG. 13 is a graph illustrating one example of envelops of each data series respectively for only the even numbered light emitting elements being turned ON and only the odd numbered light emitting elements being turned ON.

DETAILED DESCRIPTION OF THE PREFERRED EMBODIMENTS

An embodiment of this invention is applied to an image forming apparatus 10 that will now be explained with reference to the drawings.

Figure 1:
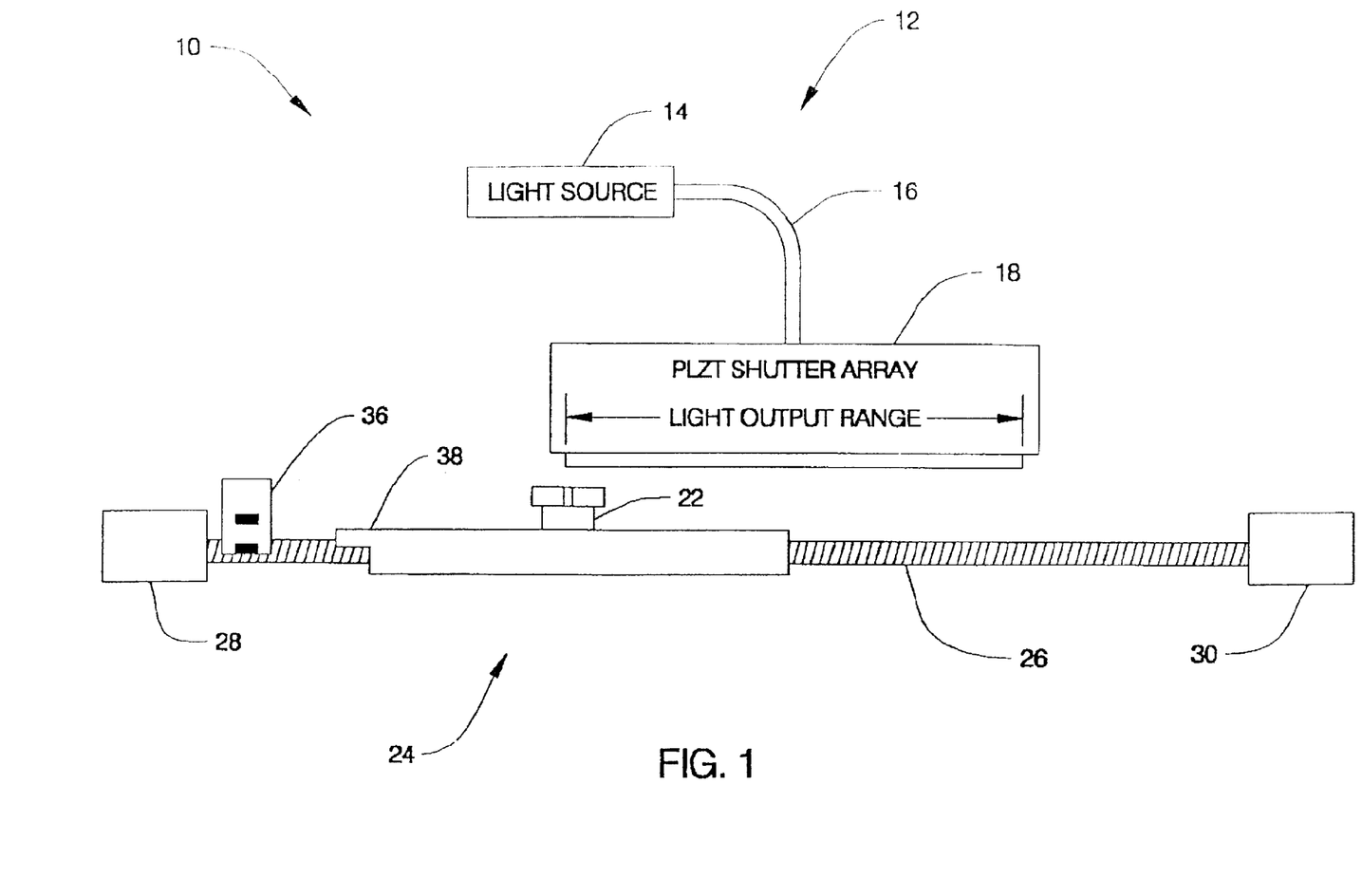
FIG. 1 is a schematic diagram illustrating the light emitting array and light receiver according to one embodiment of the present invention.
Figure 2:
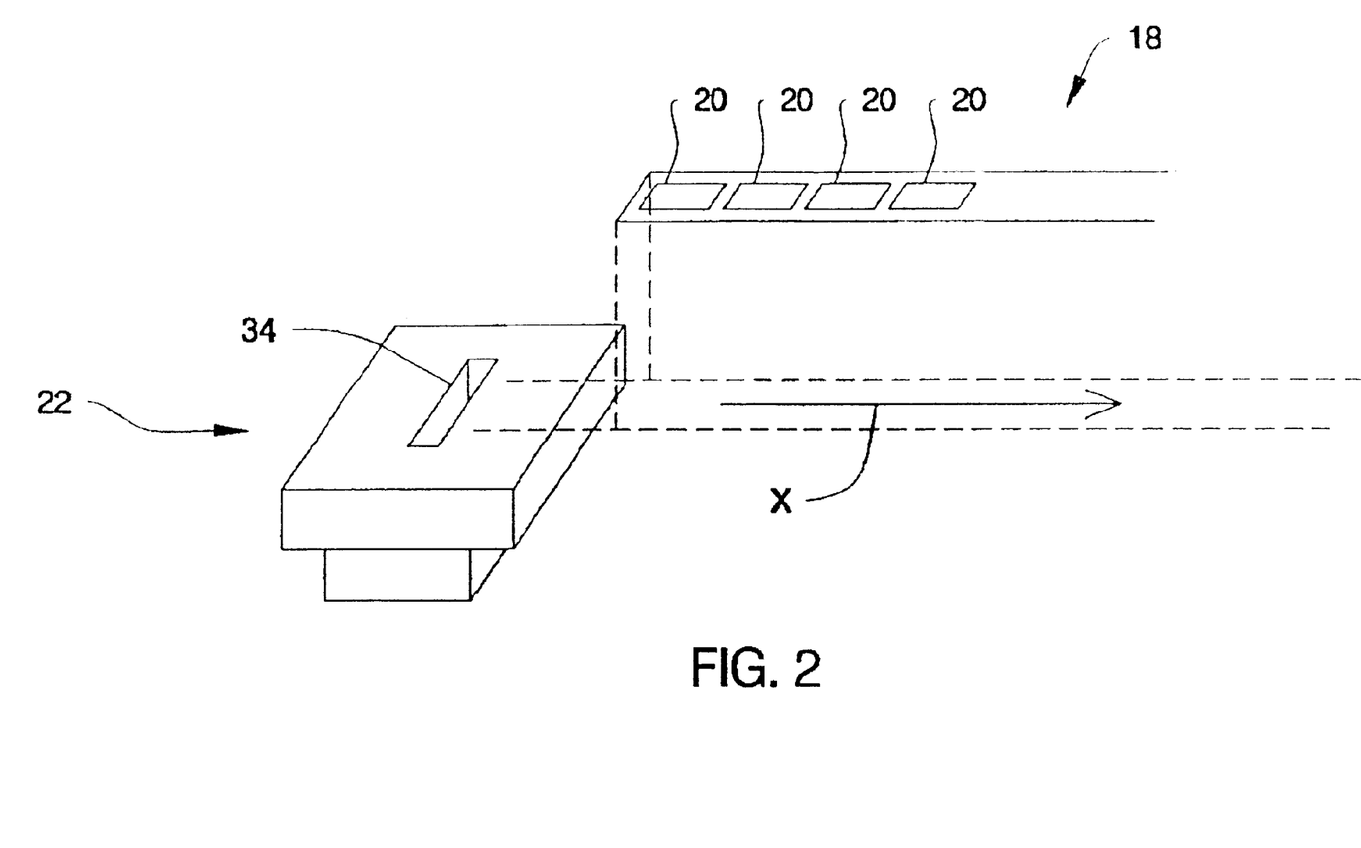
FIG. 2 is a main part of the light emitting array and light receiver according to one embodiment of the present invention.

Referring to FIG. 1 and FIG. 2, the image forming apparatus 10 of the embodiment of this invention includes an exposing part 12. The exposing part 12 comprises a light source 14 such as a halogen lamp, an optical fiber bundle 16 and a lead lanthanum zirconate titanate (PLZT) shutter array 18 which is a print head. Light irradiated from the light source 14 is transmitted through the optical fiber bundle 16 to each light emitting element 20. On the PLZT shutter array 18, a plurality of the light emitting elements are arranged in one direction, and through an opening duration of the shutter each element is independently controlled. Thus a light amount emitted per unit time from each light emitting element 20 can be independently controlled.

Along an imaging face of the PLZT shutter array 18, a light receiving element 22, for example, a photo multiplier, is made to scan by a light receiving element transfer system 24. Then the light amount emitted from each light emitting element 20 is measured. The light receiving element transfer system 24 comprises a ball screw 26, a support member 28 for supporting one end of the ball screw 26, a motor 30 for rotating the ball screw 26 and a table that moves with the ball screw 26. The ball screw 26 is rotated by the motor 30 of the light receiving element transfer system 24. The table 32 is moved by a rotation of the ball screw 26 and the light receiving element 22 fixed on the table 32 can scan along the imaging face of the light emitting elements 20 of the PLZT shutter array 18. As seen from FIG. 2, a slit 34 is provided perpendicular to a scanning direction X so that light from the adjacent light emitting element 20 is not detected. Further, adjacent to the support member 28 of the light emitting element transfer system 24, a home sensor 36 is located for determining whether the light receiving element is at the base position. The home sensor 36 includes, for example, a photo coupler and it detects one end 38 of the table 32, and in this position, it is determined that the light receiving element 22 is at the base position.

Figure 3:
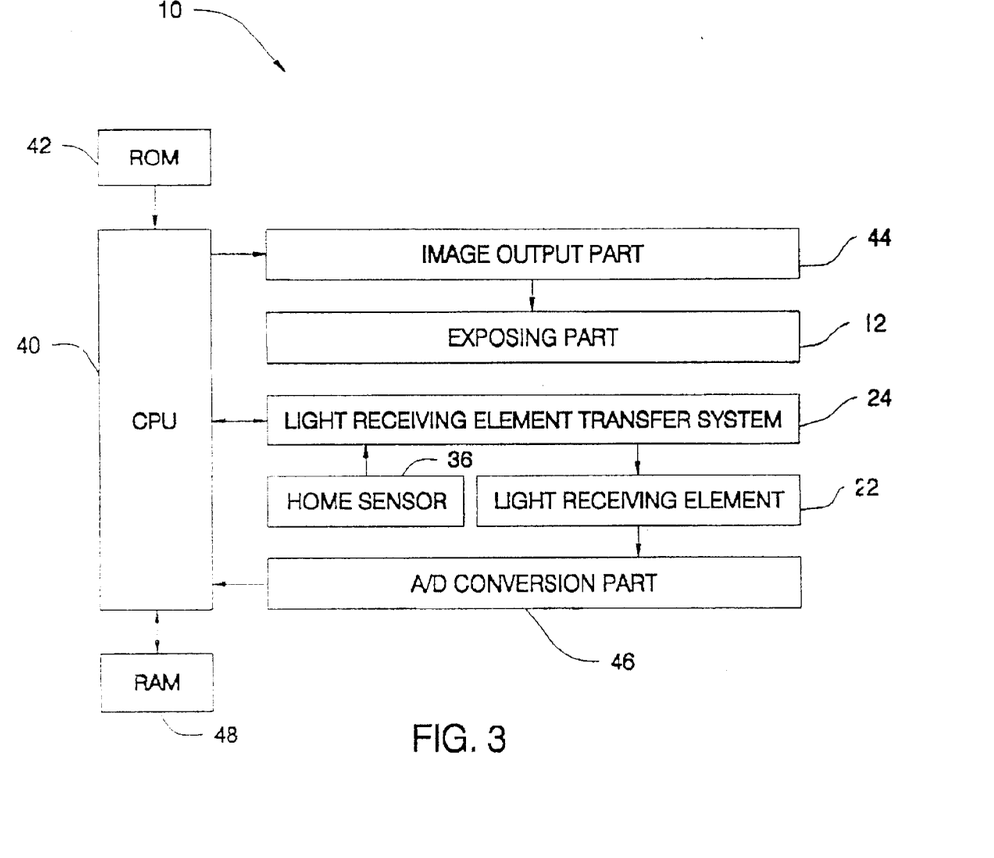
FIG. 3 is a block diagram including a control system according to one embodiment of the present invention.

In FIG. 3, an electrical block diagram of the image forming apparatus 10 is shown.

Referring to FIG. 3, the image forming apparatus includes a central processing unit (CPU) 40 which controls each part in accordance with a program stored in a read-only memory (ROM) 42. From the CPU 42, image data for measurement is transferred to an image output part 44 which performs a preparation procedure for the exposure with the exposing part 12. Upon completing the image data transfer and the preparation for the exposure, after having moved the light receiving element 22 to the base position with the light receiving element transfer system 24 and the home sensor 36, the CPU 40 controls the light emitting elements 20 to emit light. Further the CPU 40 controls the light receiving element 22 to scan along the imaging face of the PLZT shutter array 18 at a constant speed. Having confirmed that the speed of the light receiving element 22 is constant, the CPU 40 instructs an analog/digital (A/D) conversion part or converter 46 to commence taking in data. The A/D converter 46 samples the analog data taken in from the light receiving element 22 and converts it into a data series indicating the luminous power that it contains. If the CPU 22 has confirmed that the movement of the light receiving element 22 is stopped based on the activity of the light receiving element transfer system 24, the CPU 40 transmits the data series indicating the luminous power contained in the A/D conversion part 46, which has been previously processed by the CPU 40 if required, into a random access memory (RAM) 48. Then, the position detection of the light emitting elements is performed in accordance with the program stored in the ROM 42 and the luminous power correction is performed based on the luminous power at each light emitting element position.

Operation of the image forming apparatus 10 will now be described.

Figure 4:
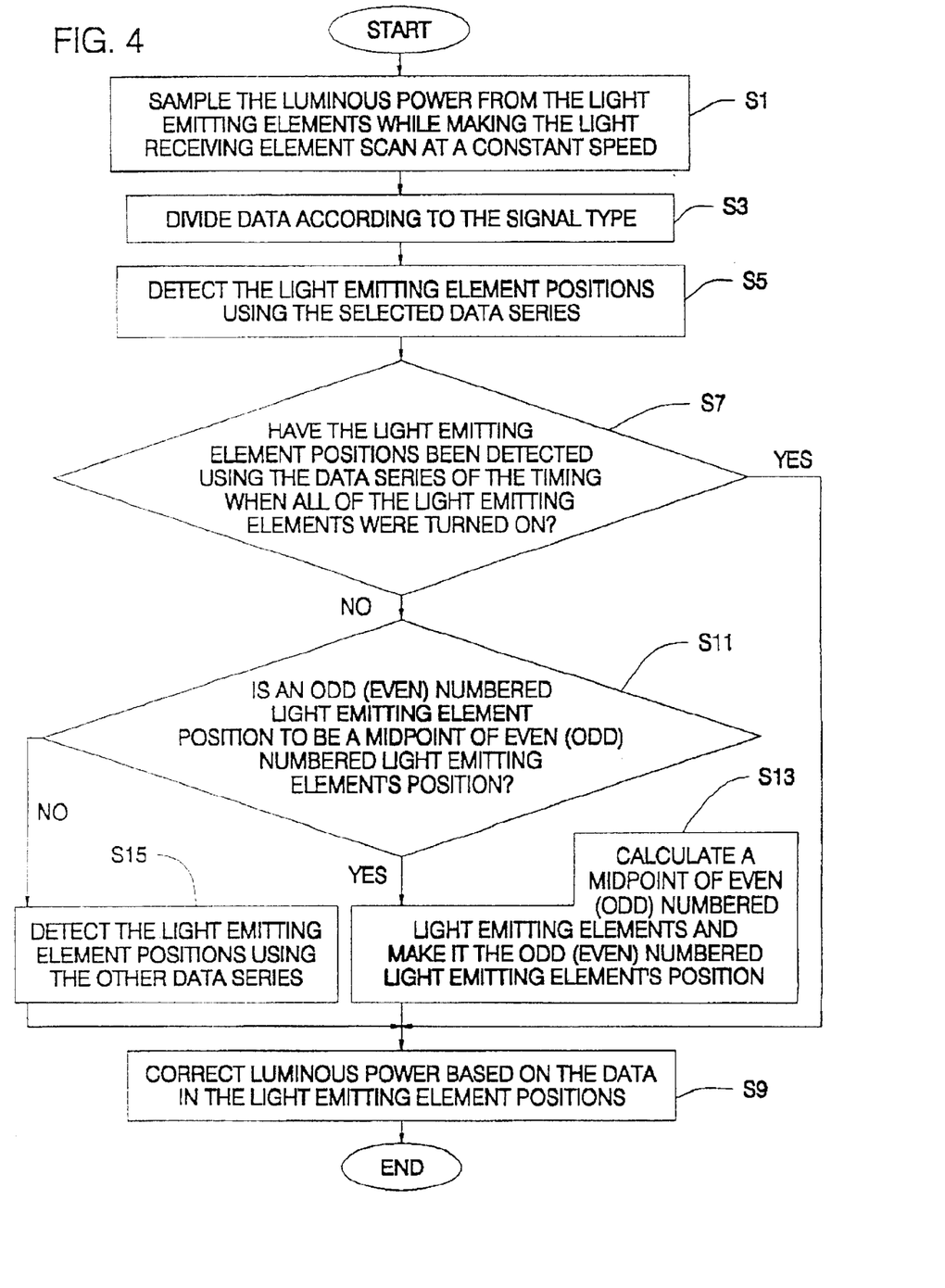
FIG. 4 is a flow chart illustrating one example of the operation of the present invention.
Figure 6A:
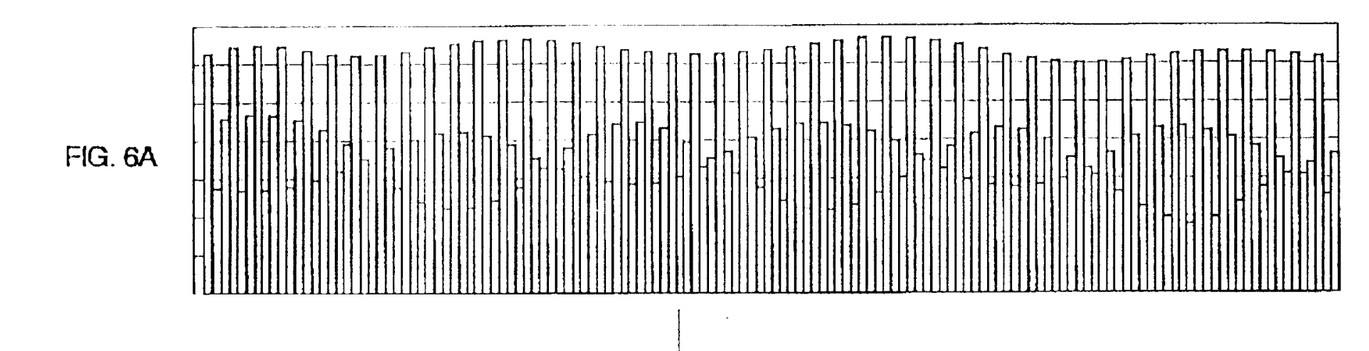

Referring to FIG. 4, initially while making the light emitting elements 20 arranged in one direction emit light and making the light receiving element 22 scan along the imaging face of the PLZT shutter array 18 at a constant speed, the luminous power from the light emitting elements 20 is sampled in a sufficiently short time interval (step S1). A scanning speed of the light receiving element 22 is calculated from a predetermined sampling interval with the A/D conversion part 46, a number of samples per one light emitting element and a number of signal types and these are set so as to obtain the desired data. The signal type is a light emitting pattern of the PLZT shutter array which is any one of the following patterns: where only the even numbered light emitting elements 20 are ON; where only the odd numbered light emitting elements 20 are ON; and where all of the light emitting elements are ON. During the scanning of the light receiving element 22, a light emitting pattern of the PLZT shutter array 18 is periodically shifted synchronously with the sampling interval, according to which data series indicating the luminous power arranged in the sampling order as shown in FIG. 6A is contained in the A/D conversion part 46.

Figure 6B:
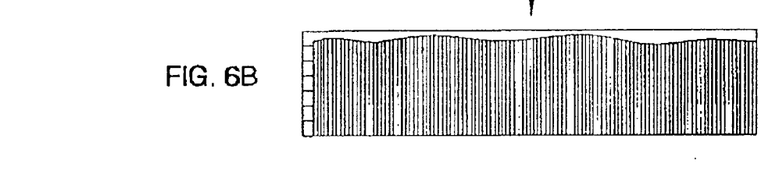
Figure 6C:
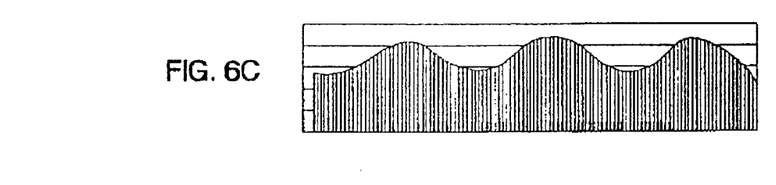
Figure 6D:
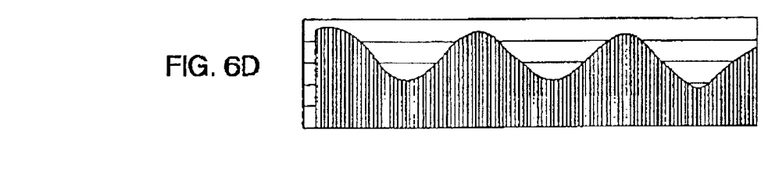

This data series is given from the A/D conversion part 46 to the CPU 40 and divided according to the signal type by the CPU 40. Then the data series as shown in FIGS. 6B–6D are obtained (step S3). The data series shown in FIGS. 6B through 6D are stored in the RAM 48. Among them a data series for the detection is selected and the light emitting element positions are detected using the selected data series (step S5).

Then, it is determined whether the data series, as shown in FIG. 6B, that is obtained when all of the light emitting elements are turned ON is detected (step S7). If the position of light emitting elements are detected using the data series when all of the light emitting elements are turned ON, a luminous power correction is performed based on data at each light emitting element position in a well known manner (step S9).

If, in step S7, the positions of the light emitting elements are not detected using the data series when all of the light emitting elements are turned ON, it proceeds to step S11. In step S11, when the positions of the light emitting element are detected using the data series when the even numbered light emitting elements are turned ON, as shown in FIG. 6C, it is decided whether a position of the odd numbered light emitting elements 20 is to be a midpoint of even numbered light emitting elements 20. Also, when the positions of light emitting elements are detected using the data series when the odd numbered light emitting elements are turned ON, as shown in FIG. 6D, it is decided whether a position of the even numbered light emitting elements 20 is to be midpoints of the odd numbered light emitting elements 20. If step S11 is yes, when the positions of the odd numbered light emitting elements are detected, the midpoint of the even numbered light emitting elements is calculated and made to be the position of the odd numbered light emitting elements. On the other hand, when the positions of the even numbered light emitting elements are detected, the midpoint of the odd numbered light emitting elements is calculated and made to be the position of the even numbered light emitting elements (step S13) and it proceeds to step S9.

If the answer in step S11 is NO, the positions of the light emitting elements are detected using the other data series (step S15). That is, when in step S5 the positions of the light emitting elements are detected using the data series of the timing when only the even numbered light emitting elements 20 are turned ON, in step S15 the positions of the light emitting elements are detected using the data series of the timing when only the odd numbered light emitting elements 20 are turned ON. On the other hand, when in step S5 the positions of the light emitting elements are detected using the data series of when only the odd numbered light emitting elements 20 are turned ON, in step S15 the positions of the light emitting elements are detected using the data series when only the even numbered light emitting elements 20 are turned ON. Then, it proceeds to step S9.

Figure 5:
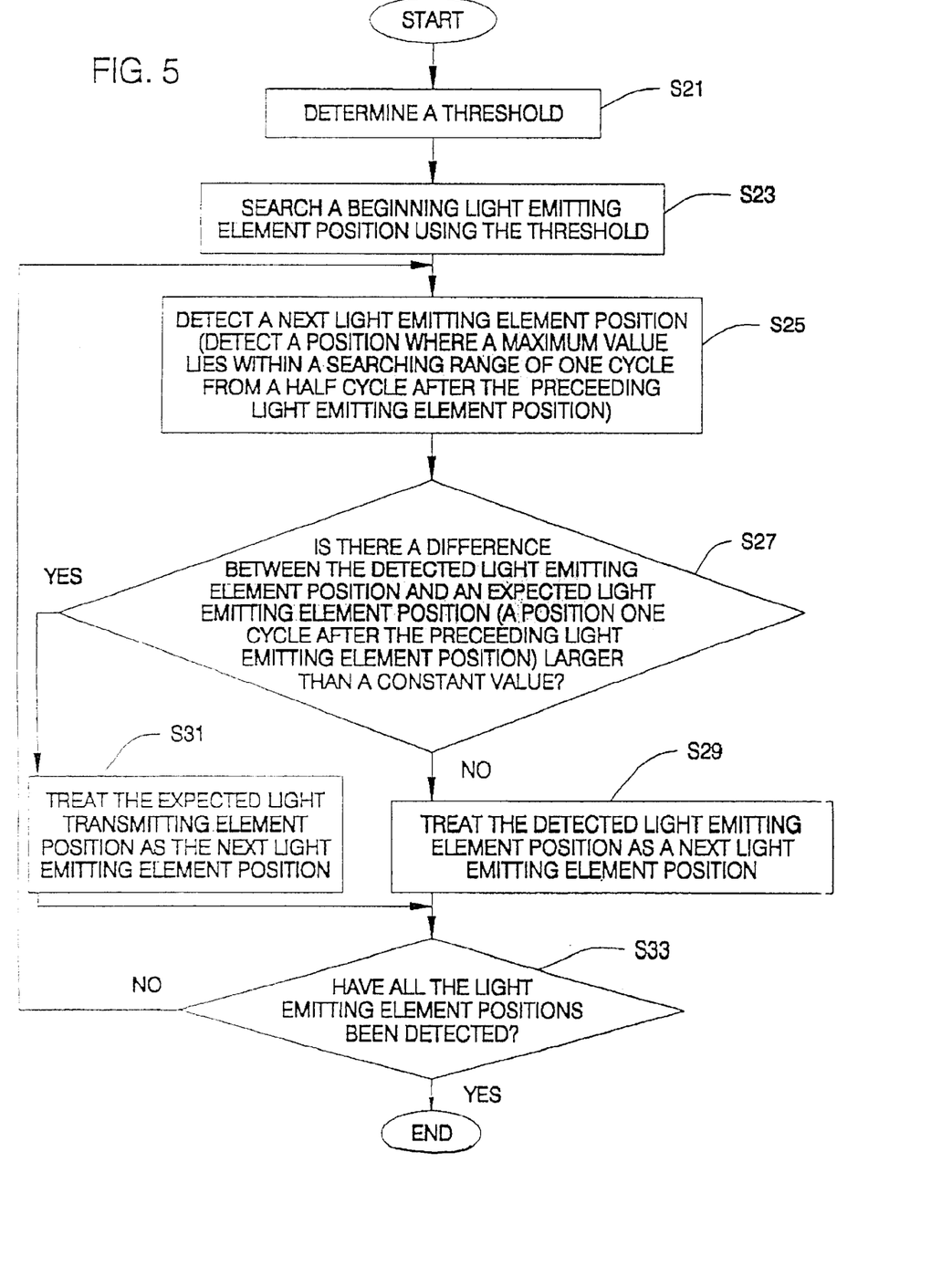
FIG. 5 is a flow chart illustrating one example of the detailed operation of steps S5 and S15 in FIG. 4.

Subsequently, referring to FIG. 5, a detailed operation of steps S5 and S15 will be described. Further wave forms shown in FIGS. 7 through 13 indicate envelopes of data series.

Figure 7:
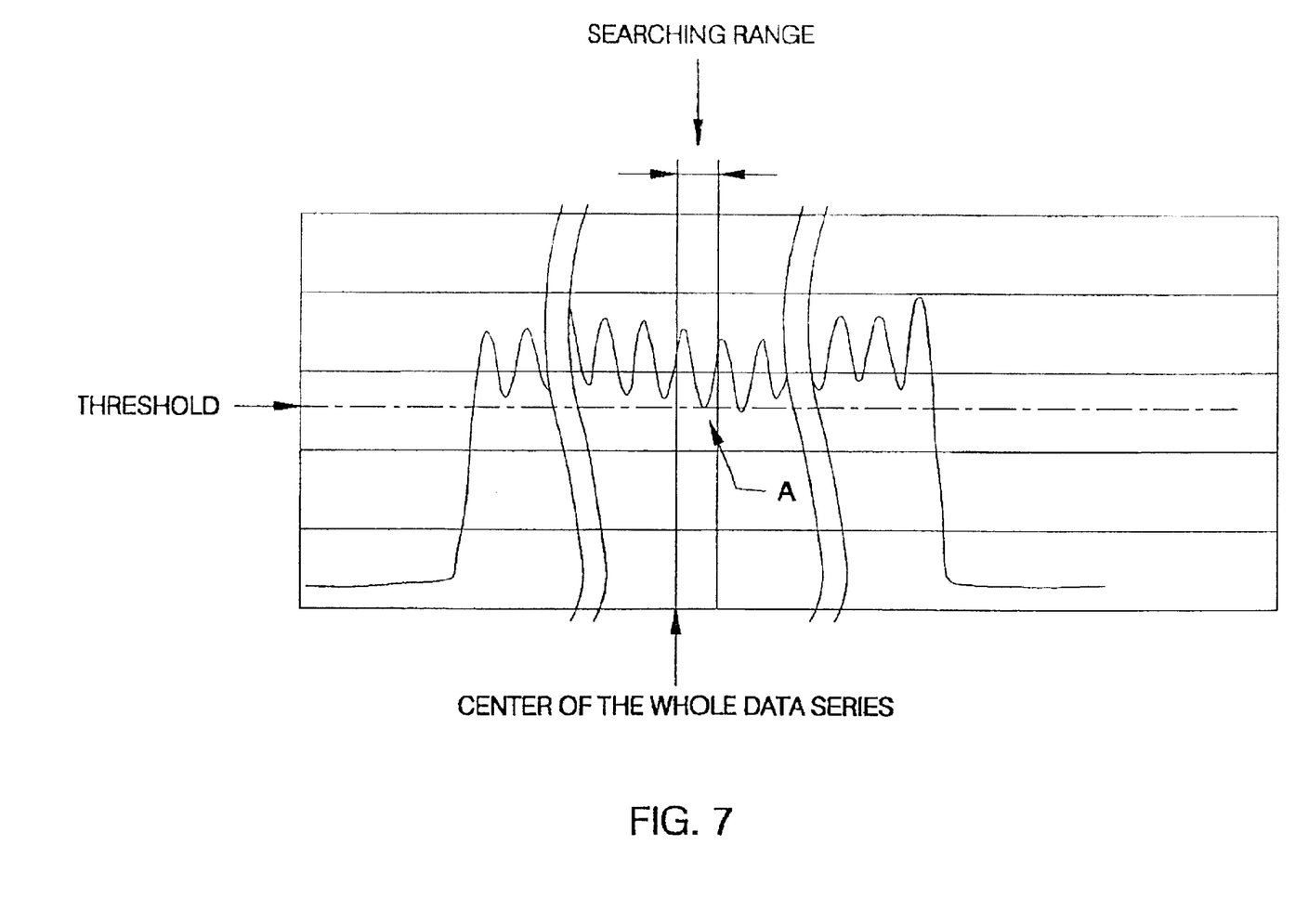
FIG. 7 is a graph for explaining how a threshold is detected.

Initially, a threshold is determined (step 21). For example, as shown in FIG. 7, a minimum value in a portion nearby a center of a selected data series, where data necessarily exists, is made a threshold value. Herein the minimum value will be the minimum value within a searching range of one cycle from the center of the whole data series, as shown by arrow A. If a position of the minimum value is at an edge of this searching range, a smaller value possibly exists, then a minimum value is most likely found by expanding the searching range and the minimum value is made the threshold.

Figure 8:
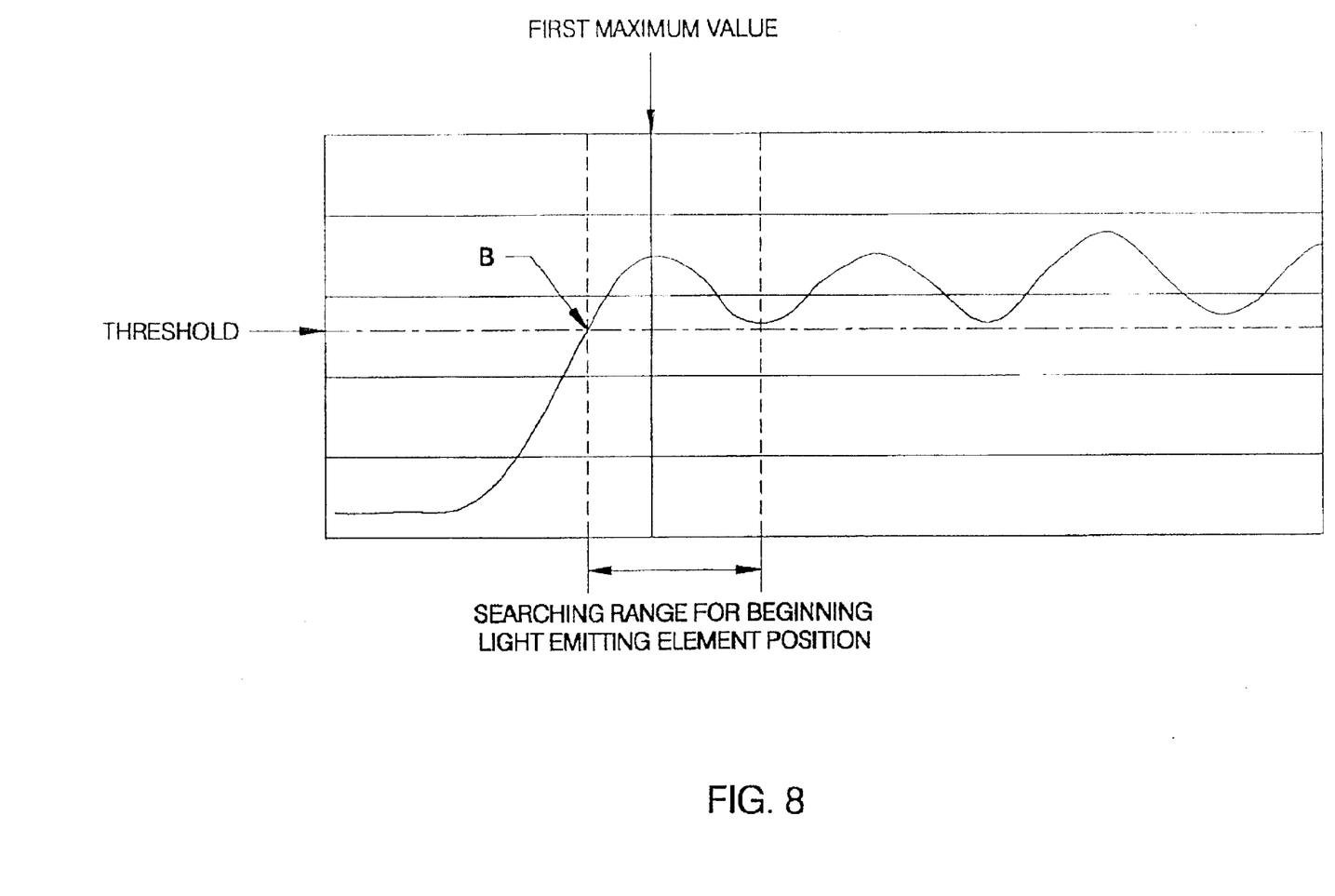
FIG. 8 is a graph for explaining how a beginning or first light emitting element position is detected.

Next, a beginning or first light emitting element position is searched and determined (step S23). As shown in FIG. 8, the detected threshold and data series are compared sequentially from the beginning. Then the first place of the data series exceeding the threshold is detected. Herein, an arrow B is the first place the threshold is exceeded. Within a searching range of one cycle from this first place i.e. a searching range for a beginning light emitting element position, a first minimum value is detected, then a position of the detected maximum value is made for the beginning light emitting element position.

Figure 9:
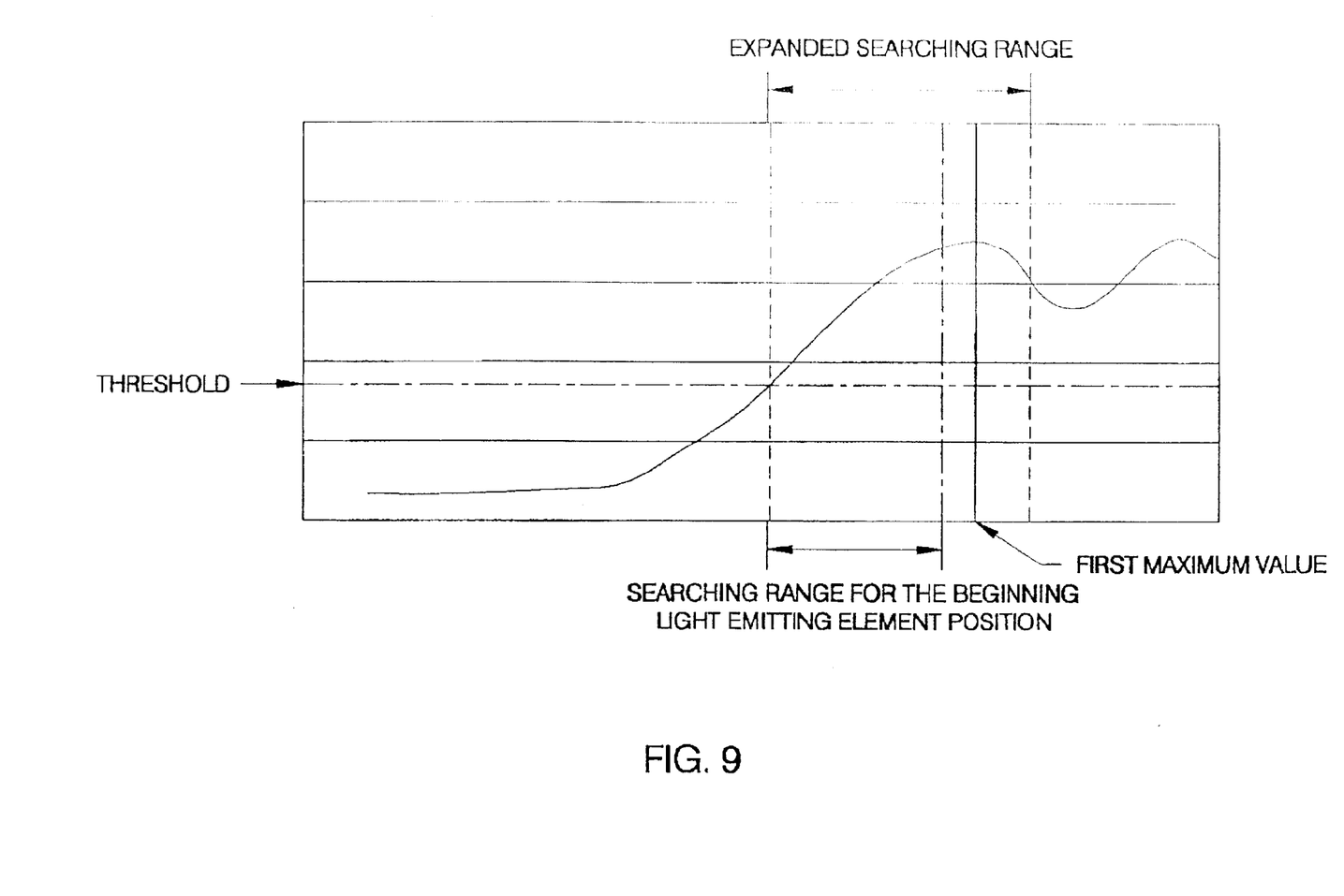
FIG. 9 is a graph for explaining how a maximum value is detected by expanding a searching range.

At this time, for example as shown in FIG. 9, if the maximum value does not exist within the searching range for the beginning light emitting element position (e.g. the maximum value lies at the edge of the searching range), the searching range is expanded and the first maximum value is detected. Thereby detecting precision for the beginning or first light emitting element's position is improved.

Then a position for the next light emitting element is detected. At this time, taking into account that one maximum value usually exists in one cycle of the data series, a position where a maximum value lies within a searching range of one cycle from a half cycle after the preceding position of light emitting element, i.e. a searching range for a position of the next light emitting element is detected (step S25).

Figure 10:
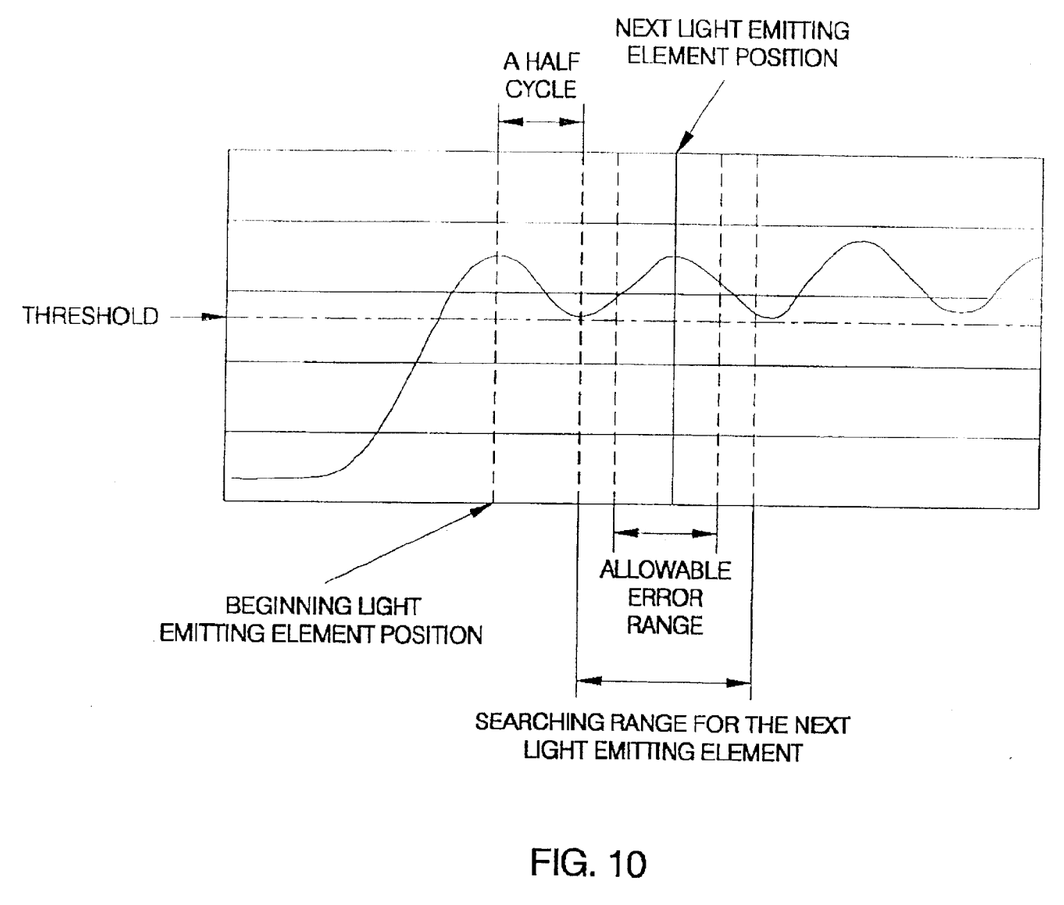
FIG. 10 is a graph for explaining how a second light emitting element position is detected.

It is determined whether a difference between the detected light emitting element position and an expected light emitting element position (a position one cycle after the preceding light emitting element position), i.e. an error, is larger than a predetermined constant value (step S27). If the error is less than the constant value, the detected light emitting element position is treated as the next light emitting element position (step S29). For example as shown in FIG. 10, when the maximum value is detected within an allowable error range contained in the next searching range for the position of light emitting element, a position of the detected maximum value is treated as the next light emitting element's position.

Figure 11:
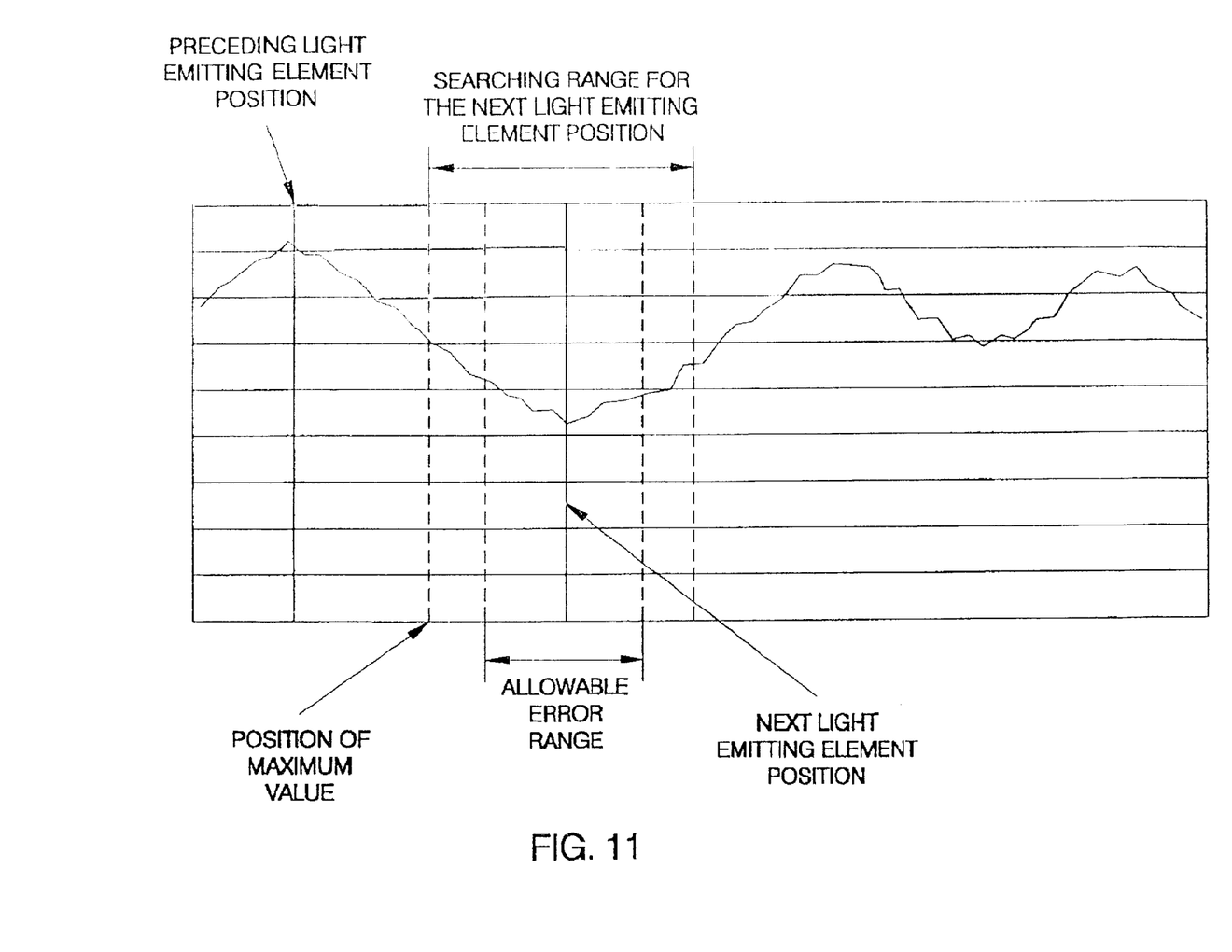
FIG. 11 is a graph for explaining how an expected light emitting element position is treated as a next light emitting element position when the maximum value is not within an allowable error range.

On the other hand, if the error is more than the constant value, the expected light emitting element position is treated as the next light emitting element position (step S31). In case that the maximum value is detected at a position far away from a center of searching range for the next light emitting element position (beyond the allowable error range), a failure of the light emitting element 20 or so seems to be a cause which affects the subsequent detection for the light emitting element position. Therefore, in the case that the maximum value is detected further away from the center of the searching range than the predetermined or expected position, the light emitting element is considered to have failed and the center of the next searching range for the light emitting element position, i.e. the expected light emitting element position, is treated as the position of the next light emitting element. Further as shown in FIG. 11, in case that an edge of the searching range for the next light emitting element position is a position of the maximum value, the similar process is also made. Thereby, detection of light emitting element position can not be improperly influenced.

Then, after the process in step S29 or S31, it proceeds to a step S33.

In step S33, it is determined whether the positions of all of the light emitting elements have been detected. It ends if all of the light emitting element positions have been detected and it returns to the step S25 if any positions of the light emitting elements have not been detected. Then, repeating the above described process until the last light emitting element position is determined, the positions of the light emitting elements 20 arranged in one direction are detected.

For example, all of the positions of the even numbered light emitting elements can be detected if using the data series shown in FIG. 6C and all of the positions of the odd numbered light emitting elements can be detected if using the data series shown in FIG. 6D.

In accordance with the image forming apparatus 10 that operates in such a way, taking into account that the position with the maximum value corresponds to the position of the light emitting element, by detecting the maximum value of the data series the position of the light emitting element is detected. Thus errors are unlikely to occur even in the case of a longer length display and the position of the light emitting element can be accurately detected. Based on the luminous power at each light emitting element position, a proper luminous power correction becomes possible. Also, the position detection is performed by detecting the maximum value, so high precision in mechanical machining and assembly is not required and the ease of operation is improved.

Figure 12:
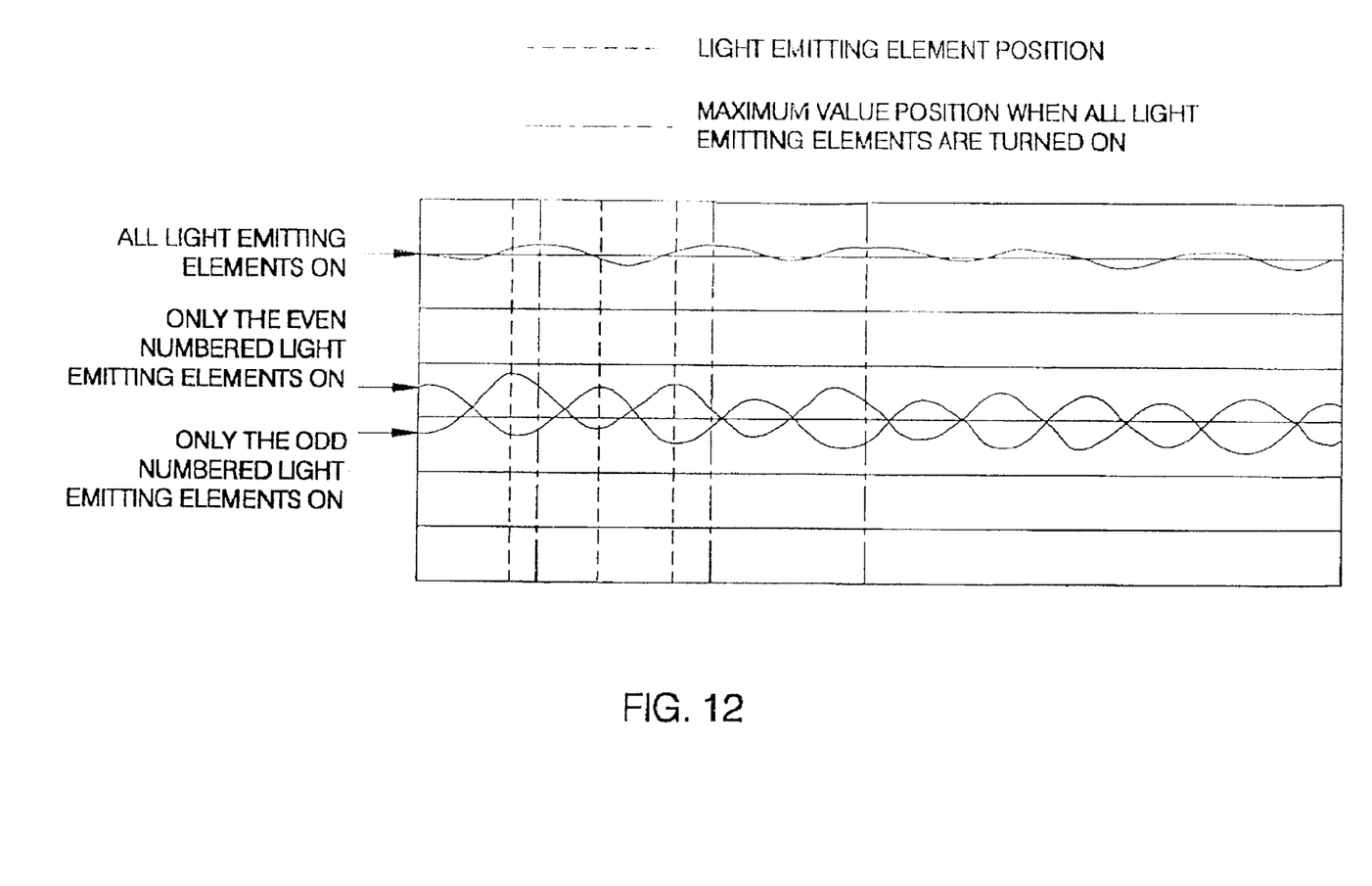
FIG. 12 is a plurality of graphs illustrating one example of envelops of each data series respectively when all light emitting elements are turned ON; when only the even numbered light emitting elements are turned ON; and when only the odd numbered light emitting elements are turned ON, in the case of close spacing between the light emitting elements.
Figure 13:
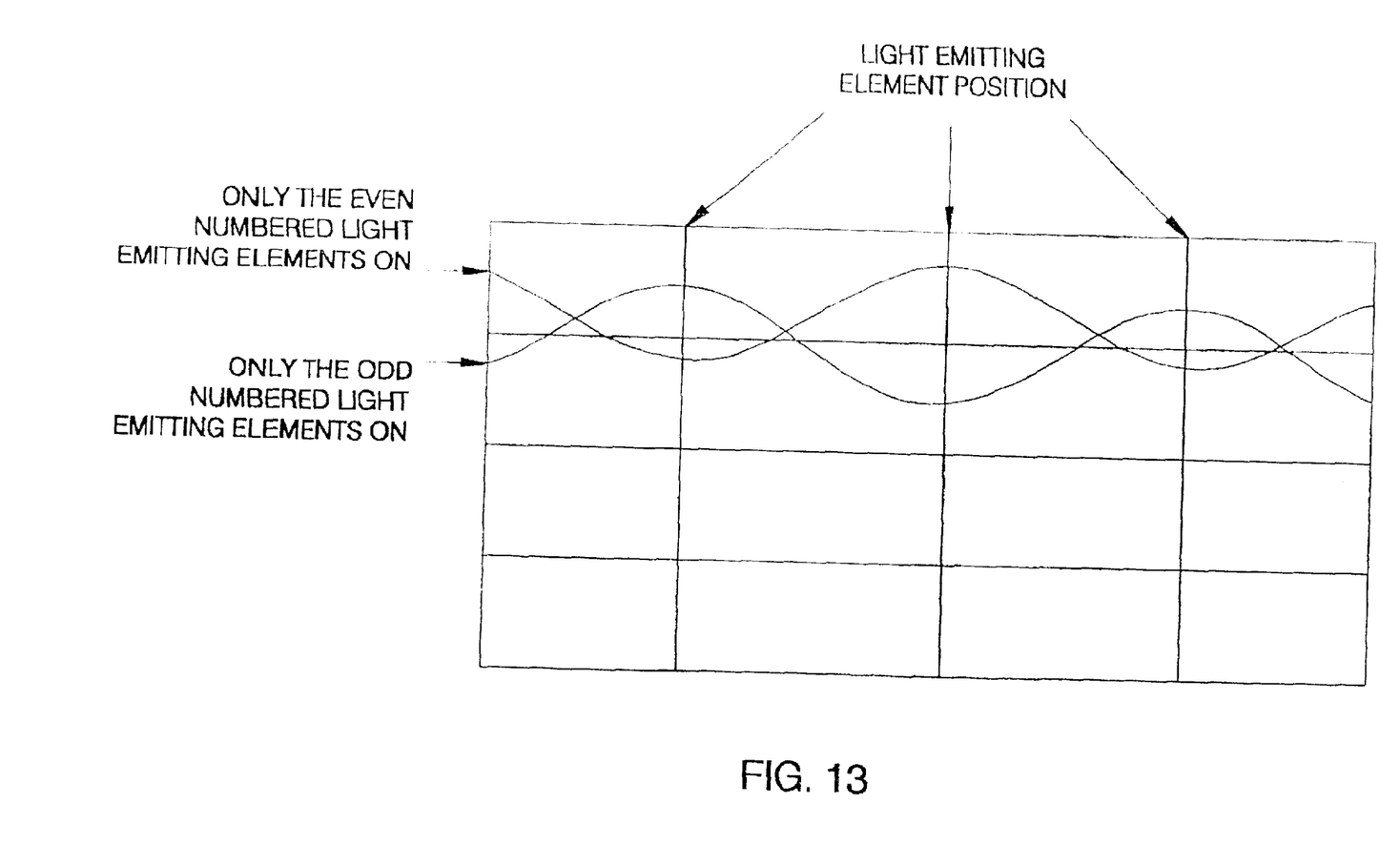

Further in the image forming apparatus 10, if the spacing between the light emitting elements 20 is close, the maximum value position and the light emitting element position may not coincide in the data series as shown in FIG. 12 when all light emitting elements 20 are turned ON. Previously this occasionally resulted in the light emitting element not being detected. Accordingly in this invention, each light emitting element position is detected by performing the above described process for the data series when only the even numbered light emitting elements 20 are turned ON and the data series when only the odd numbered light emitting elements 20 are turned ON. Arranging the detected light emitting element positions alternately enables detection of all of the light emitting element positions (see FIG. 13). Alternatively, the light emitting element position is detected based on either one of the data series when only the even numbered light emitting elements 20 are turned ON and the data series when only the odd numbered light emitting elements 20 are turned ON. Then all of the light emitting element positions can also be detected by calculating a center of the detected light emitting element positions. If the spacing between the light emitting elements is close, using the data of the time when the light emitting elements 20 are alternately lighted facilitates detecting the maximum value and detecting all of the positions of the light emitting element.

Further, the threshold is not limited to the minimum value in the vicinity of the center of the whole data series. Any of the minimum values contained in the data series or an arbitrary value can also be used.

Further, while in the above described embodiment the PLZT shutter array has been used as the print head, it is not limited to this structure. It is also possible to have the print head be all devices using a plurality of light emitting elements arranged in one direction such as a liquid crystal shutter array, a light emitting diode (LED) shutter array and a DMD shutter array.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application number 10-186949 filed Jun. 16, 1998 is incorporated herein by reference.

What is claimed is:

1. A position detecting method for detecting a position of each light emitting element of a print head having a plurality of light emitting elements arranged along one direction, said position detecting method comprising:
    lighting selected light emitting elements among the plurality of light emitting elements;
    measuring luminous power emitted from the light emitting elements by making a light receiver scan in the direction of arrangement of the light emitting elements;
    obtaining a data series indicating luminous power based on the results of said step of measuring;
    comparing the data series with a threshold and detecting a first place that exceeds the threshold from the beginning of the data series;
    determining a position of a maximum value closest to the first place as a first light emitting element position among the lighted light emitting elements; and
    determining additional positions of maximum value as light emitting element positions in terms of the positions of the light emitting elements after the first light emitting element position.

2. The position detecting method as claimed in claim 1, wherein said step of lighting selected light emitting elements further comprises alternately lighting the plurality of light emitting elements.

3. The position detecting method as claimed in claim 1, wherein said step of determining a position of maximum value further comprises expanding a searching range and detecting the maximum value when the maximum value can not be detected within a searching range of one cycle.

4. The position detecting method as claimed in claim 1, wherein said step of determining additional positions of maximum value further comprises detecting the maximum value within a searching range of one cycle after a half cycle following the position of a preceding light emitting element after the first light emitting element position is detected.

5. The position detecting method as claimed in claim 4, wherein said step of determining additional positions of maximum value further comprises treating a center of the searching range of one cycle as the light emitting element position when the maximum value is detected farther away from a center of the searching range of one cycle than a predetermined position.

6. The position detecting method as claimed in claim 1 wherein the threshold is any one of a plurality of minimum values contained in the data series from the light receiver.

7. The position detecting method as claimed in claim 1, wherein the threshold is an arbitrary value.

8. The position detecting method as claimed in claim 1, wherein the print head includes a PLZT shutter array.

9. A position detecting apparatus for detecting a position of each light emitting element of a print head having a plurality of light emitting elements arranged in one direction, said position detecting apparatus comprising:
    lighting means for selectively lighting the light emitting elements;
    light receiving means for measuring luminous power emitted from said light emitting elements;
    scanning means for making said light receiving means scan in the direction said light emitting elements;
    means for obtaining at least one data series indicating luminous power based on measurements obtained by said light receiving means;
    detecting means for comparing the data series with a threshold and detecting a first place exceeding the threshold from the beginning of the data series;
    means for determining a position of maximum value closest to the first place as a first light emitting element position among the light emitting elements lighted by said lighting means; and
    means for determining additional positions of maximum value as light emitting element positions in terms of the positions of the light emitting element after the first light emitting element position.

10. The position detecting apparatus as claimed in claim 9, wherein said lighting means includes means for alternately lighting said plurality of light emitting elements.

11. The position detecting method as claimed in claim 9, further comprising means for expanding a searching range and detecting the maximum value when the maximum value can not be detected within the searching range of one cycle.

12. The position detecting method as claimed in claim 9, further comprising means for detecting the maximum value within a searching range of one cycle after a half cycle following a preceding light emitting element position after the first light emitting element position is detected.

13. The position detecting apparatus as claimed in claim 12, further comprising means for treating a center of the searching range of one cycle as the light emitting element position, when the maximum value is detected further away from a center of the searching range of one cycle than the predetermined position.

14. The position detecting apparatus as claimed in claim 9, wherein the threshold is any one of a plurality of minimum values contained in the data series from said light receiving means.

15. The position detecting apparatus as claimed in claim 9, wherein the threshold is an arbitrary value.

16. The position detecting apparatus as claimed in claim 9, wherein said print head includes a PLZT shutter array.

* * * * *